United States Patent
Kim et al.

(10) Patent No.: US 7,154,789 B2
(45) Date of Patent: Dec. 26, 2006

(54) HIGH-VOLTAGE GENERATOR CIRCUIT AND SEMICONDUCTOR MEMORY DEVICE INCLUDING THE SAME

(75) Inventors: Jong-Hwa Kim, Gyeonggi-do (KR); Dae-Seok Byeon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/977,426

(22) Filed: Oct. 28, 2004

(65) Prior Publication Data

US 2005/0128821 A1   Jun. 16, 2005

(30) Foreign Application Priority Data

Dec. 15, 2003   (KR) .............. 10-2003-0091305

(51) Int. Cl.
   *G11C 5/14* (2006.01)
(52) U.S. Cl. .............. 365/189.09; 365/189.06
(58) Field of Classification Search .......... 365/189.09, 365/189.06
   See application file for complete search history.

(56) References Cited

U.S. PATENT DOCUMENTS

| | | | |
|---|---|---|---|
| 5,276,646 A * | 1/1994 | Kim et al. ............ | 365/189.09 |
| 5,329,168 A * | 7/1994 | Sugibayashi et al. ....... | 327/535 |
| 5,473,496 A * | 12/1995 | Rouy ................ | 361/18 |
| 5,835,420 A * | 11/1998 | Lee et al. ............ | 365/189.09 |
| 5,883,501 A | 3/1999 | Arakawa | |
| 6,259,612 B1 * | 7/2001 | Itoh .................. | 363/60 |
| 6,611,450 B1 * | 8/2003 | Oowaki et al. ........... | 365/145 |
| 6,807,111 B1 * | 10/2004 | Marotta et al. ........ | 365/189.09 |
| 6,842,384 B1 * | 1/2005 | Lee ................ | 365/189.09 |
| 6,958,947 B1 * | 10/2005 | Park et al. .............. | 365/228 |
| 6,967,877 B1 * | 11/2005 | Chou ................ | 365/189.09 |
| 2003/0098677 A1 | 5/2003 | Harrison | |

* cited by examiner

*Primary Examiner*—Amir Zarabian
*Assistant Examiner*—Anthan Tran
(74) *Attorney, Agent, or Firm*—Marger Johnson & McCollom, P.C.

(57) ABSTRACT

According to embodiments of the invention, a high-voltage generator circuit may include a voltage detector block that has a voltage divider, a discharge section, a comparator, and a control signal generator. The voltage divider generates a divided voltage at an output node by dividing a high voltage. The discharge section discharges the high voltage to a power voltage in response to a first control signal. The comparator determines whether the divided voltage reaches a reference voltage, and the control signal generator generates a second control signal in response to an output from the comparator and the first control signal. The voltage divider may include a high-voltage prevention circuit that prevents the high voltage from being applied to a low-voltage transistor of the comparator during a discharge period of the high voltage. The high-voltage prevention circuit may include a depletion-type or enhancement-type NMOS transistor having a high breakdown voltage.

15 Claims, 8 Drawing Sheets

HIGH-VOLTAGE GENERATOR CIRCUIT AND SEMICONDUCTOR MEMORY DEVICE INCLUDING THE SAME

CROSS REFERENCE TO RELATED APPLICATIONS

This application claims priority from Korean Patent Application No. 2003-91305, filed on 15 Dec. 2003, the content of which is incorporated by reference in its entirety for all purposes.

BACKGROUND OF THE INVENTION

1. Field of this Invention

This disclosure relates to a semiconductor integrated circuit device, and more particularly, to a semiconductor integrated circuit device using a voltage higher than a power supply voltage.

2. Description of the Related Art

Generally, a semiconductor integrated circuit device performs an internal operation by means of an externally provided power supply voltage. In addition, the semiconductor integrated circuit device internally generates a higher voltage than the externally provided power supply voltage and performs an internal operation using the higher voltage. In a semiconductor memory device that uses a voltage of 3.3V or greater, a MOS transistor of a circuit region driven with the power supply voltage (hereinafter, referred to as a low-voltage circuit region) has a breakdown voltage capable of enduring the internally generated higher voltage, for example, in a semiconductor integrated circuit device that uses a voltage of 3.3V or greater. In this case, a circuit region operating at a high voltage (hereinafter, referred to as a high-voltage circuit region) may be directly connected to the low-voltage circuit region. Even if the high-voltage circuit region is directly connected to the low-voltage circuit region, the MOS transistor of the low-voltage circuit region may not be broken down by the high voltage from the high-voltage circuit region. This is because the MOS transistor of the low-voltage circuit region has a breakdown voltage capable of enduring the high voltage.

As power supply voltages become lower and the increased integration of semiconductor integrated circuit device accelerates, a low-voltage transistor whose current capacity is large and whose size is small is used as the MOS transistor in the low-voltage circuit region. Therefore, the breakdown voltages of the low-voltage circuit region are also lowered. Especially if the breakdown voltage of the low-voltage transistor is lower than the high voltage used in the high-voltage circuit region, the low-voltage transistor of the low-voltage circuit region may break down due to the high voltage from the high-voltage circuit region, which is supplied when the low-voltage circuit region is directly connected to the high-voltage circuit region.

FIG. 1 is a block diagram illustrating a conventional high-voltage generator circuit. The high-voltage generator circuit 100 in FIG. 1 is disclosed in U.S. Pat. No. 5,276,646, entitled "HIGH VOLTAGE GENERATING CIRCUIT FOR A SEMICONDUCTOR MEMORY CIRCUIT", which is herein incorporated by reference.

Referring to FIG. 1, the high-voltage generator circuit 100 includes a high-voltage pump block 110 and a voltage detector block 120. The high-voltage pump block 110 generates a high voltage Vpp in response to a pump control signal PUMP_OSC, and the high voltage Vpp is provided to a peripheral circuit and the voltage detector block 120. The pump control signal PUMP_OSC is a clock signal of a predetermined period. The voltage detector block 120 determine whether the high voltage Vpp reaches a target voltage, and generates a pump control signal PUMP_OSC as a detection result. For example, if the high voltage Vpp is lower than the target voltage, the voltage detector block 120 generates a pump control signal PUMP_OSC that oscillates in a predetermined period. The high-voltage pump block 110 performs a pump operation in response to the pump control signal PUMP_OSC, and the high voltage may increase to a target voltage as a result. When the high voltage Vpp reaches the target voltage, the voltage detector block 120 inactivates the pump control signal PUMP_OSC. This makes the high-voltage pump block 110 not operate anymore. Therefore, the high voltage Vpp is maintained uniformly.

FIG. 2 is a circuit diagram illustrating the voltage detector block 120 of FIG. 1. Referring to FIG. 2, the voltage detector block 120 includes a voltage divider 121, a comparator 122, a pump control signal generator 123, a discharge section 124, and inverters INV3 and INV4. The voltage divider 121 comprises resistors R1 and R2 and an NMOS transistor MN1, and divides a high voltage Vpp to generate a divided voltage Vdiv according to a resistance ratio of the resistors R1 and R2. The comparator 122 includes PMOS transistors MP1, MP2, and MP3 as well as NMOS transistors MN2, MN3, and MN4. The comparator compares the divided voltage Vdiv with a reference voltage Vref. The pump control signal generator 123 includes NAND gates G1 and G2 and inverters INV1 and INV2. The signal generator 123 generates a pump control signal PUMP_OSC in response to an output of comparator 122, control signal C2 through inverters INV3 and INV4, and an oscillation signal OSC. A discharge section 124 includes a PMOS transistor MP4 and NMOS transistors MN5 and MN6. The discharge section 124 discharges the high voltage Vpp to a power supply voltage in response to outputs /C2 and C2 of the inverters INV3 and INV4.

In FIG. 2, the NMOS transistors MN5 and MN6 are high-voltage transistors each having a breakdown voltage capable of enduring the high voltage Vpp, and the remaining transistors are low-voltage transistors having a relatively low breakdown voltage compared to the high-voltage transistors MN5 and MN6.

FIG. 3 is a timing diagram illustrating the operation of the high-voltage generator circuit of FIG. 1.

Referring to FIGS. 2 and 3, control signals C1 and C2 become high and an oscillation signal OSC is provided from an oscillation circuit (not shown) to the high-voltage generator circuit 100. A pump control signal generator 123 generates a pump control signal PUMP_OSC in synchronization with the oscillation signal OSC because the control signal C2 is at a high level and the divided voltage Vdiv is lower than a reference voltage Vref (e.g., 0.8V) at an initial pump operation or before the high-voltage Vpp reaches a target voltage. The high-voltage pump block 110 performs a pump operation in response to the pump control signal PUMP_OSC oscillating in a given period, and as a result, the high voltage Vpp increases toward the target voltage. If the high voltage Vpp reaches the target voltage, the comparator 122 generates a low-level signal. Because the low-level signal as an output of the comparator 122 and an output (i.e., a high-level signal) of the inverter INV4 are applied to the NAND gate G1, the pump control signal generator 123 generates the pump control signal PUMP_OSC of a low level regardless of the oscillation signal OSC. This means that the high-voltage pump block 110 does not operate. If the high voltage Vpp is lowered by an internal operation, the voltage detector block 120 generates the pump control signal PUMP_OSC oscillating in the given period, thus increasing the lowered high voltage Vpp to the target voltage.

When the desired internal operation is ended, each of the control signals C1 and C2 transitions from a high level to a low level as illustrated in FIG. 3. When the control signal C1 transitions to the low level, the NMOS transistor MN1 is turned off. At the same time, when the control signal C2 transitions to a low level, the transistors MP4 and MN5 of the discharge section 124 are turned on by outputs of the inverters INV3 and INV4. As the transistors MP4 and MN5 are turned on, the high voltage Vpp is discharged to a power supply voltage through transistors MN6, MN5, and MP4.

When the control signals C1 and C2 are all at a high level, only a low voltage (e.g., the voltage is the same as the reference voltage or lower) is applied to a node ND1. However, when all of the control signals C1 and C2 become low to discharge the high voltage Vpp, the high voltage Vpp is applied to the node ND1 in an instant. Since the high voltage of the node ND1 is applied to a drain of the NMOS transistor and a gate of the NMOS transistor MN3, the NMOS transistors MN1 and MN3 are broken down. Thus, the NMOS transistors MN1 and MN3 of the high-voltage generator circuit break down when the high voltage Vpp is discharged.

Embodiments of the invention address these and other disadvantages of the conventional art.

SUMMARY OF THE INVENTION

Some embodiments of the invention may provide a semiconductor integrated circuit device capable of preventing a low-voltage transistor from being broken down due to a high voltage. Other embodiments of the invention may provide a high-voltage generator circuit and a semiconductor memory device including the same.

DETAILED DESCRIPTION OF THE INVENTION

Figure 4:
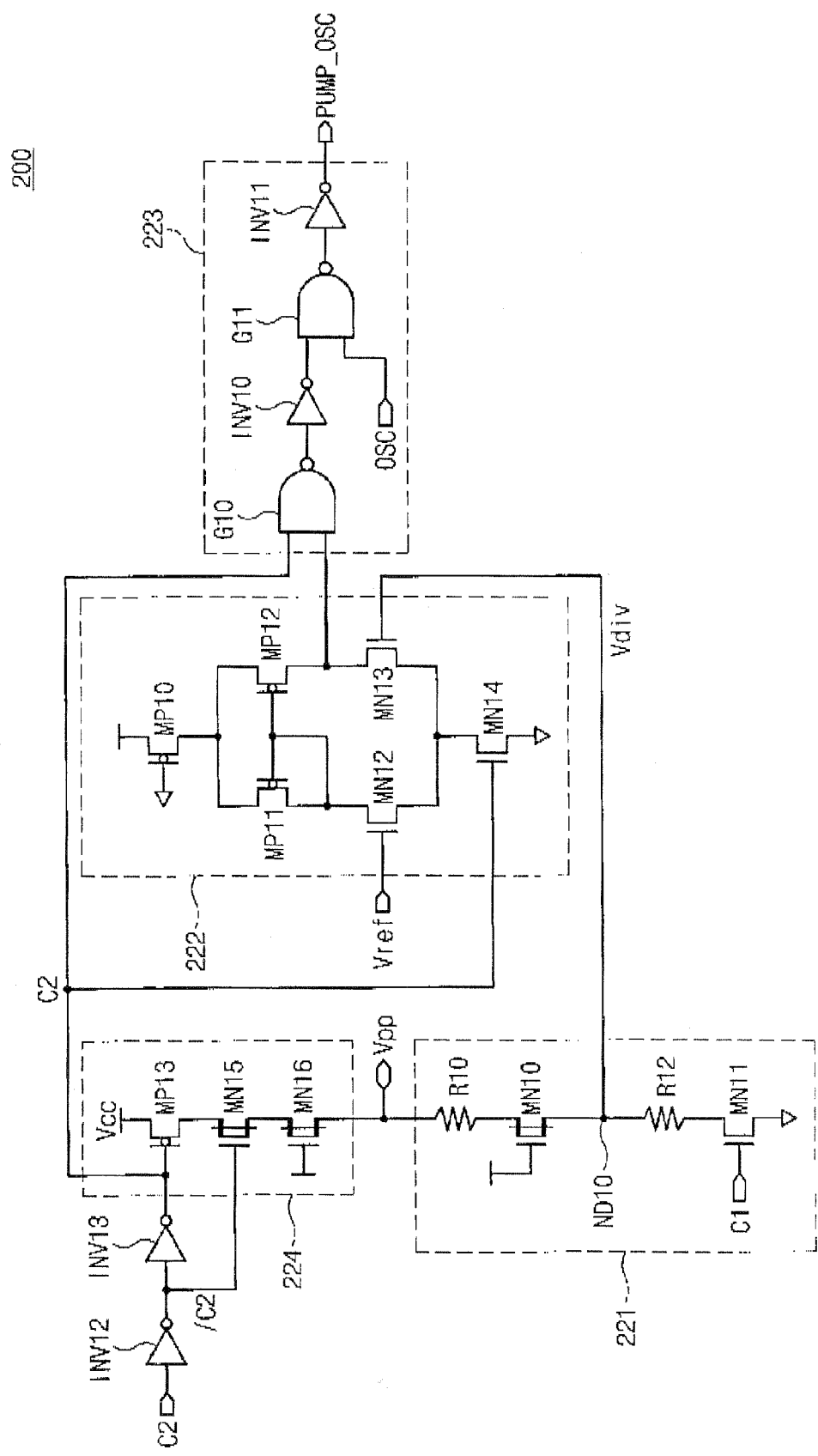
FIG. 4 is circuit diagram illustrating an exemplary voltage detector block according to some embodiments of the invention.

FIG. 4 is a circuit diagram illustrating an exemplary voltage detector block according to some embodiments of the invention. The voltage detector block 200 illustrated in FIG. 4 may be used to replace the voltage detector block 120 in the high-voltage generator circuit of FIG. 1.

Referring to FIG. 4, the voltage detector block 200 includes a voltage divider 221, a comparator 222, a pump control signal generator 223, a discharge section 224, and inverters INV12, INV13. The voltage divider 221 includes resistors R10, R12 and NMOS transistors MN10, MN11. The voltage divider 221 divides the high voltage Vpp according to the ratio of the resistors R10, R12 so as to generate the divided voltage Vdiv. The NMOS transistor MN10 may be a high-voltage depletion-type MOS transistor having a negative threshold voltage. The NMOS transistor MN11 may be a low-voltage transistor. The resistor R10 and the NMOS transistor MN10 may be connected in series between the high voltage Vpp and the node ND10. A gate of the NMOS transistor MN10 may be connected to a power supply voltage. The resistor R12 and the NMOS transistor MN11 may be connected in series between the node ND10 and a ground voltage. The NMOS transistor MN11 may be controlled by the control signal C1. According to this structure of the voltage divider 221, the node ND10 is restricted to a voltage of (VCC−(−Vth)) (Vth is a threshold voltage of the NMOS transistor) when the NMOS transistor MN11 is turned off. That is, the depletion-type MOS transistor MN10 does not affect a normal operation of the voltage divider 221 but prevents the high voltage Vpp from being applied to the node ND10, as will be further explained below.

Still referring to FIG. 4, the comparator 222 includes PMOS transistors MP10, MP11, MP12 as well as NMOS transistors MN12, MN13, MN14, which are all connected to form a differential amplifier. The transistors composing the comparator 222 may be low-voltage transistors having a low breakdown voltage. The comparator 222 compares the divided voltage Vdiv with the reference voltage Vref, and generates a high-level or a low-level signal according to a comparison result.

The pump control signal generator 223 includes NAND gates G10, G11, and inverters INV10, INV11, which are connected as illustrated in the drawing. The pump control signal generator 223 generates a pump control signal PUMP_OSC in response to an output of the comparator 222, an output signal C2 of the inverter INV13, and an oscillation signal OSC. The pump control signal generator 223 generates the pump control signal PUMP_OSC oscillating in a given period only when all of the input signals for the NAND gate G10 are at a high level.

The discharge section 224 includes a PMOS transistor MP13 and NMOS transistors MN15, MN16. The discharge section discharges the high voltage Vpp to a power supply voltage in response to outputs /C2 and C2 of the inverters INV12 and INV13, respectively.

Figure 5:
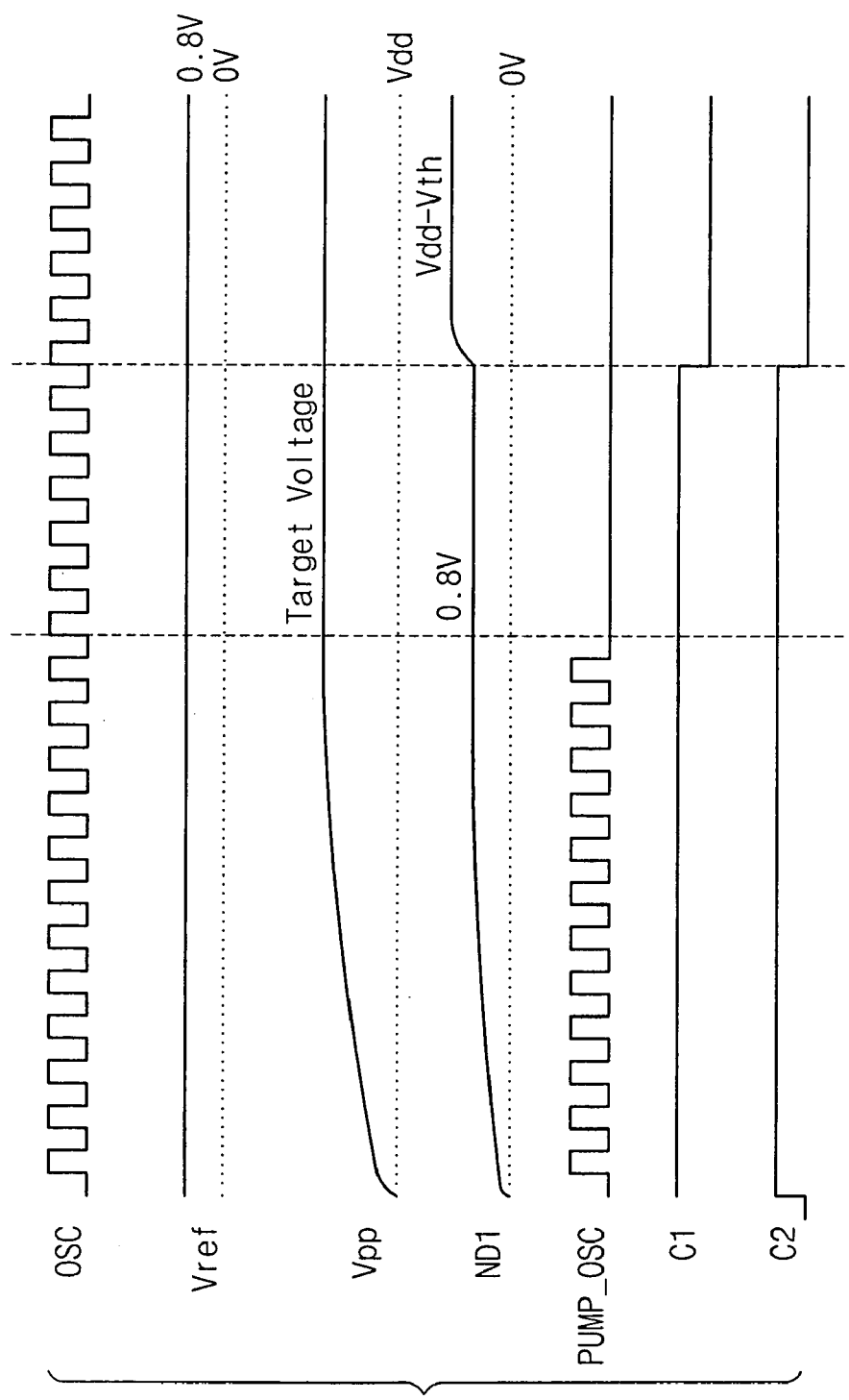
FIG. 5 is a timing diagram illustrating the operation of a high-voltage generator circuit that includes the voltage detector block of FIG. 4.

FIG. 5 is a timing diagram illustrating the operation of a high-voltage generator circuit that includes the voltage detector block 200 of FIG. 4. The high-voltage generator circuit may be similar to the high-voltage generator circuit 100 of FIG. 1, except that the high-voltage generator circuit includes the voltage detector block 200 of FIG. 4 rather than the voltage detector block 120 of FIG. 2.

Referring to FIG. 5, the control signals C1 and C2 go high and an oscillation signal OSC from an oscillation circuit (not shown) is provided to the high-voltage generator circuit. The control signal C2 is at a high level and a divided voltage Vdiv is lower than a reference voltage Vref (e.g., 0.8V) at an initial pump operation or before the high voltage Vpp reaches a target voltage, such that the pump control signal generator 223 generates a pump control signal PUMP_OSC in synchronization with the oscillation signal OSC. That is, when all signals applied to the NAND gate G10 of the pump control signal 223 are at a high level, the pump control signal PUMP_OSC oscillating at a given frequency is generated.

Figure 1:
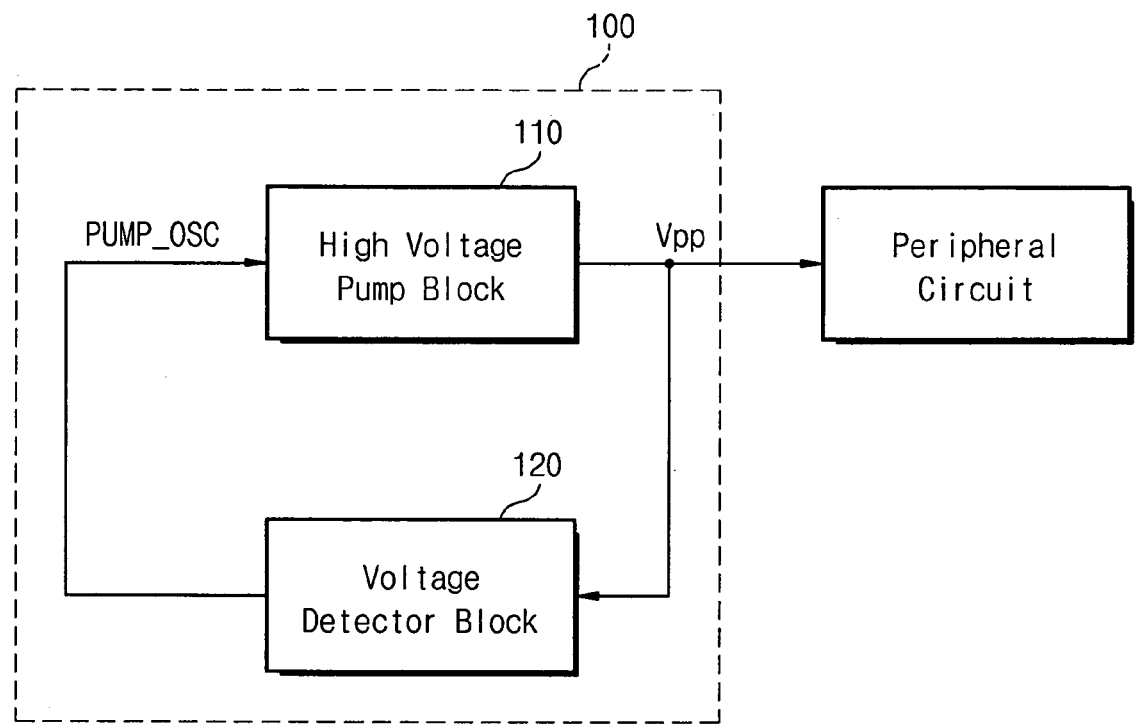
FIG. 1 is a block diagram illustrating a conventional high-voltage generator circuit.
Figure 2:
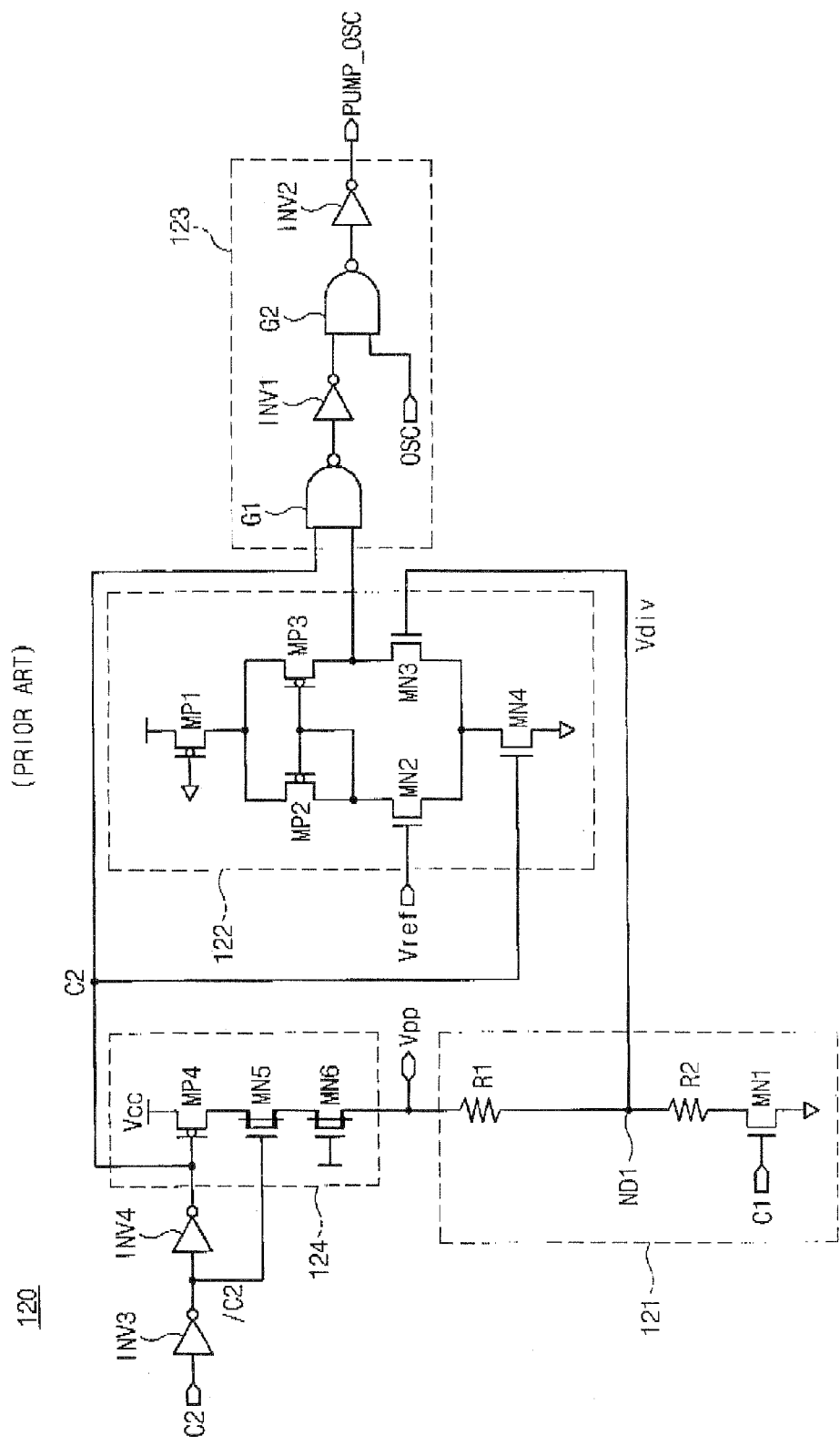
FIG. 2 is a circuit diagram illustrating the voltage detector block of FIG. 1.
Figure 3:
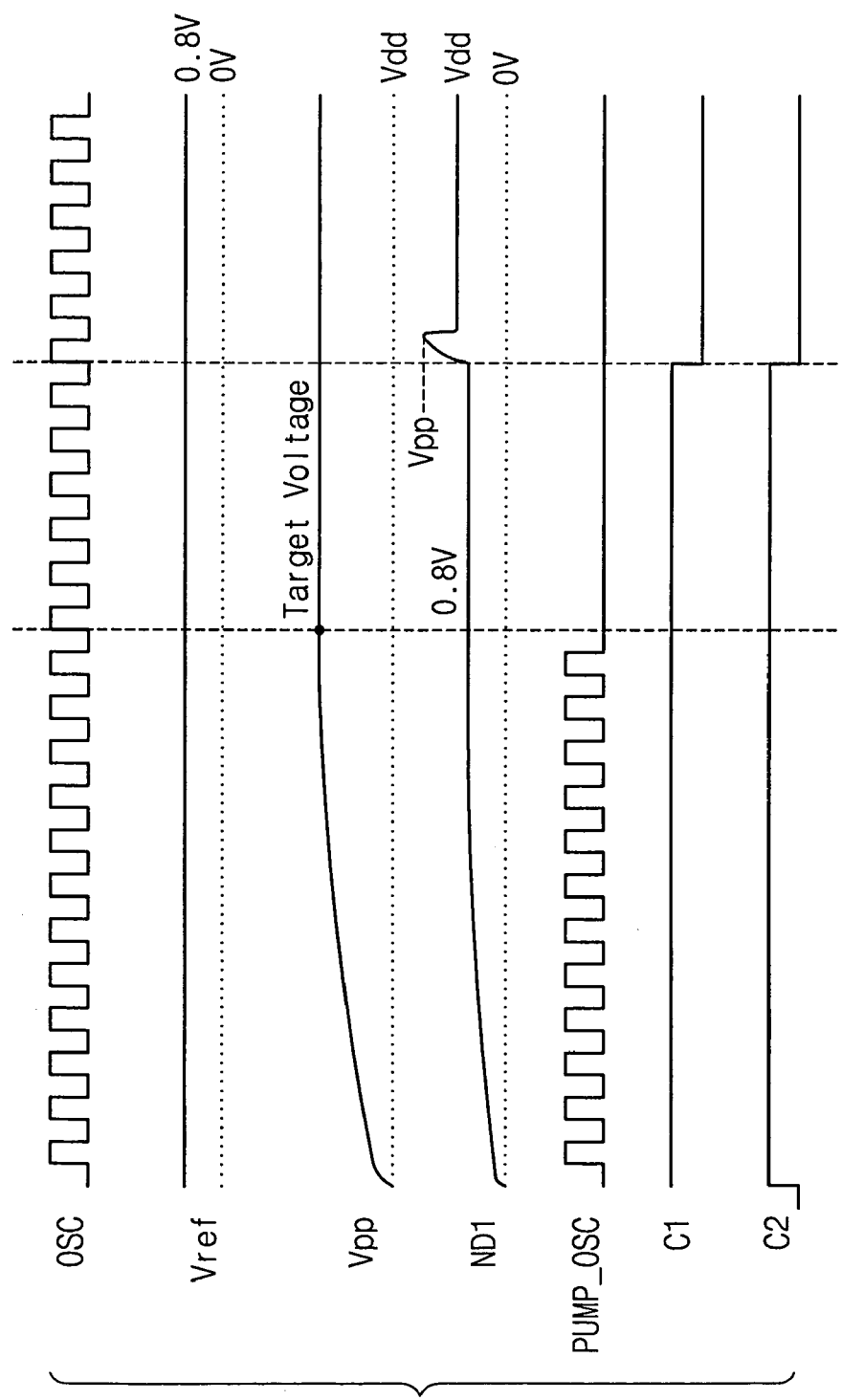
FIG. 3 is a timing diagram illustrating the operation of the high-voltage generator circuit of FIG. 1.

A high-voltage pump block, such as the high-voltage pump block 110 of FIG. 1, operates in response to the pump control signal PUMP_OSC, and the high voltage Vpp increases to the target voltage as illustrated in FIG. 5. In this case, the depletion-type MOS transistor MN10 of the voltage divider 221 delivers the voltage of the resister R10 to the node ND 10 without a voltage drop.

If the high voltage Vpp reaches a target voltage, the comparator 222 generates a low-level signal. This low-level signal from the comparator 222 and an output (a high-level signal) of the inverter INV13 are inputted to the NAND gate G10, such that the pump control signal generator 223 outputs a pump control signal PUMP_OSC of low level regardless of the state of oscillation signal OSC. Thus, the high-voltage pump block, such as the high-voltage pump block 110 of FIG. 1, may be disabled. If the high voltage Vpp decreases by an internal operation, the voltage detector block 200 generates a pump control signal PUMP_OSC that oscillates with a given period until the high voltage Vpp increases to the target voltage. This enables the lowered high voltage Vpp to increase to the target voltage.

As illustrated in FIG. 5, if the desired internal operation is ended, each of the control signals C1 and C2 transitions from a high level to a low level. When the control signal C1 transitions to the low level, the NMOS transistor MN11 is turned off by the voltage divider 221. At the same time, the control signal C2 transitions to the low level, and transistors MP13 and MN15 are turned on. When the high voltage Vpp is discharged to a power supply voltage through the turned-on transistors MN16, MN15 and MP13, the node ND10 is restricted to a voltage of (VCC−Vth) (i.e., a threshold voltage of the MN10). Since the threshold voltage of the NMOS transistor MN10 has a negative value, the node ND10 has a maximum voltage of (VCC+Vth). Therefore, the NMOS transistors MN11 and MN13, which may be low-voltage transistors, do not break down.

Figure 6:
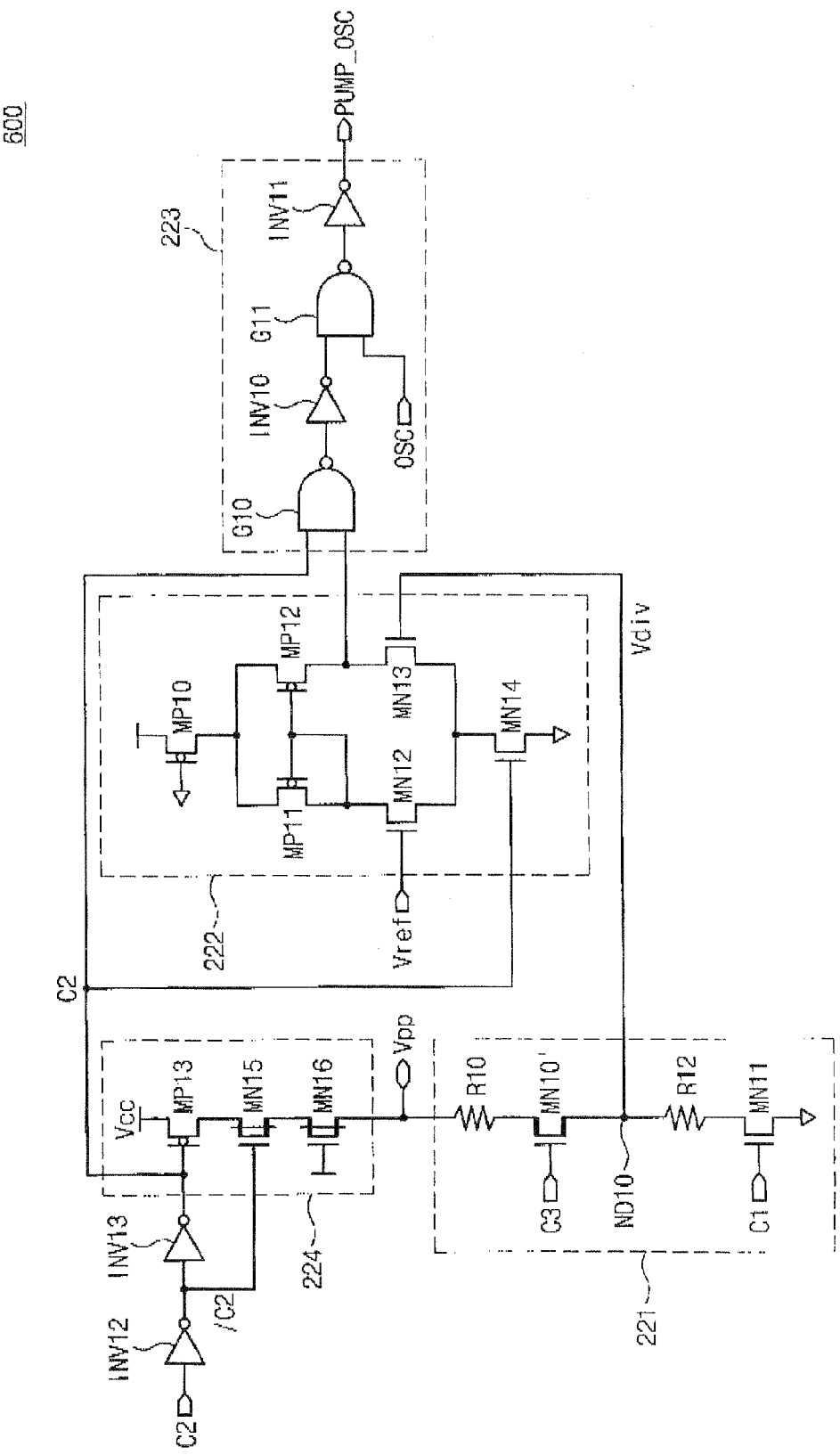
FIG. 6 is a circuit diagram illustrating a voltage detector block according to other embodiments of the invention.

FIG. 6 is circuit diagram illustrating an exemplary voltage detector block 600 according to other embodiments of the invention. Constitutent elements that perform the same function as those in FIG. 4 are marked with the same reference symbols. The voltage detector block 600 in FIG. 6 is identical to that of voltage detector block 200 in FIG. 4 except that the high-voltage depletion-type MOS transistor MN10 is replaced with the high-voltage enhancement-type NMOS transistor MN10'. The enhancement-type NMOS transistor MN10' of the voltage divider 221 is controlled by the control signal C3. A high-level voltage of the control signal C3 is set such that a voltage across a resistor R1 is transferred to the node ND10 without a voltage drop. The control signal C3 is set to a high level before the discharge operation is performed and to a low level when the discharge operation is performed. That is, when the high voltage Vpp is discharged through the discharge section 224 with the NMOS transistor MN11 being turned off, the high-voltage depletion-type NMOS transistor MN10' is turned off, and as a result the NMOS transistors MN11 and MN13 may be prevented from breaking down.

Figure 7:
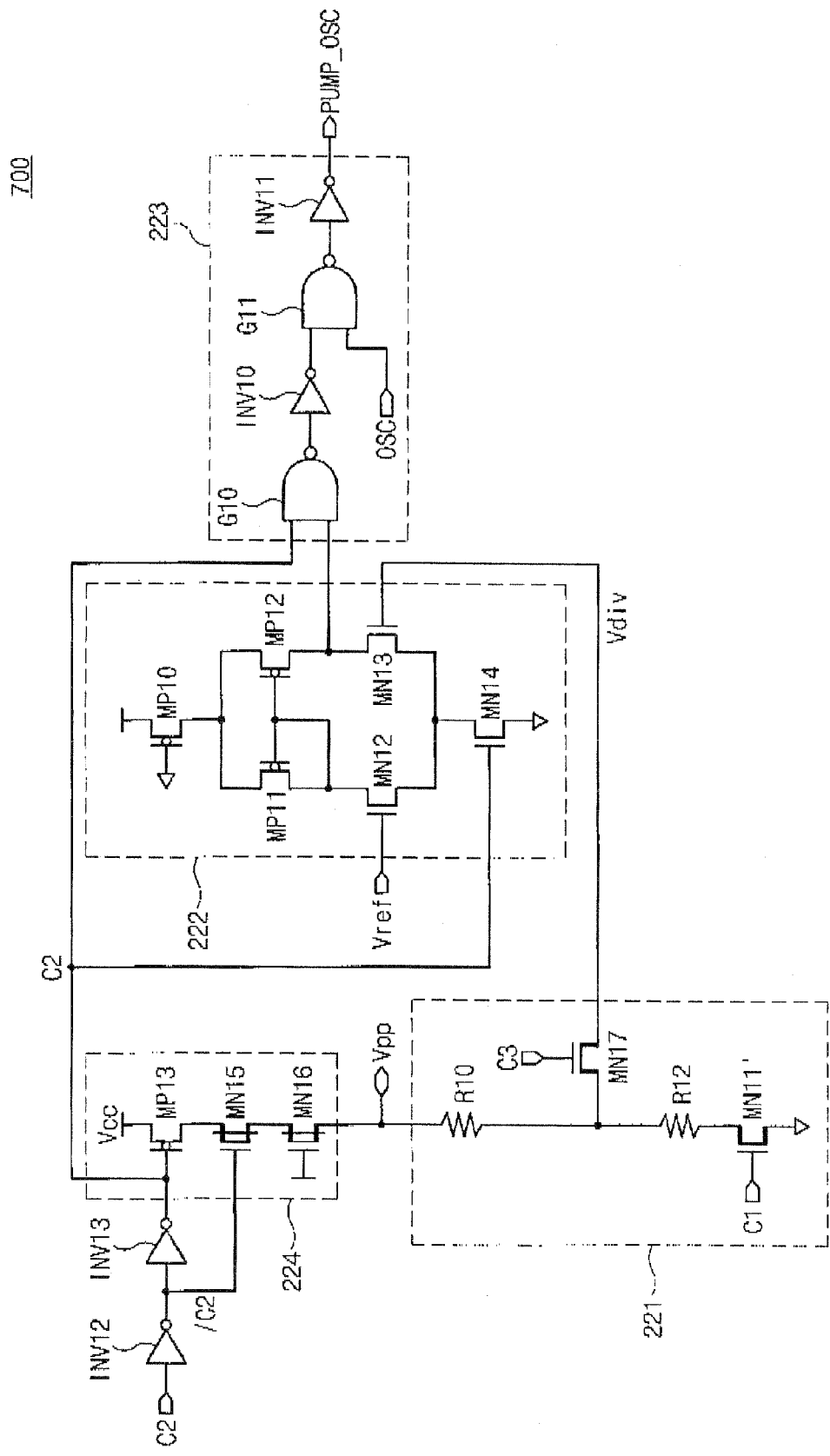
FIG. 7 is a circuit diagram illustrating a voltage detector block according to a still other embodiments of the invention.

FIG. 7 is a circuit diagram illustrating an exemplary voltage detector block 700 according to still other embodiments of the invention. In FIG. 7, constituent elements having the same function as those in FIG. 4 are marked with the same reference symbols. The voltage detector block 700 is similar to the voltage detector block 200 of FIG. 4, with the exception that the high-voltage depletion-type MOS transistor MN10 is not used, the low-voltage NMOS transistor MN11 is replaced with the high-voltage NMOS transistor MN11', and a high-voltage NMOS transistor MN17 is added between the node ND10 and the comparator 222.

The enhancement-type NMOS transistor MN17 of the voltage divider 221 is controlled by the control signal C3. The high-level voltage of the control signal C3 is set such that a voltage of the node ND10 is transferred to the NMOS transistor MN13 of the comparator 222 without a voltage drop. The control signal C3 is set to a high level before the discharge operation is carried out and to a low level when the discharge operation is carried out. That is, when the high voltage Vpp is discharged through the discharge section 224, the high-voltage enhancement-type NMOS transistors MN11' and MN17 are turned off. Therefore, the NMOS transistor MN13 is prevented from breaking down.

Figure 8:
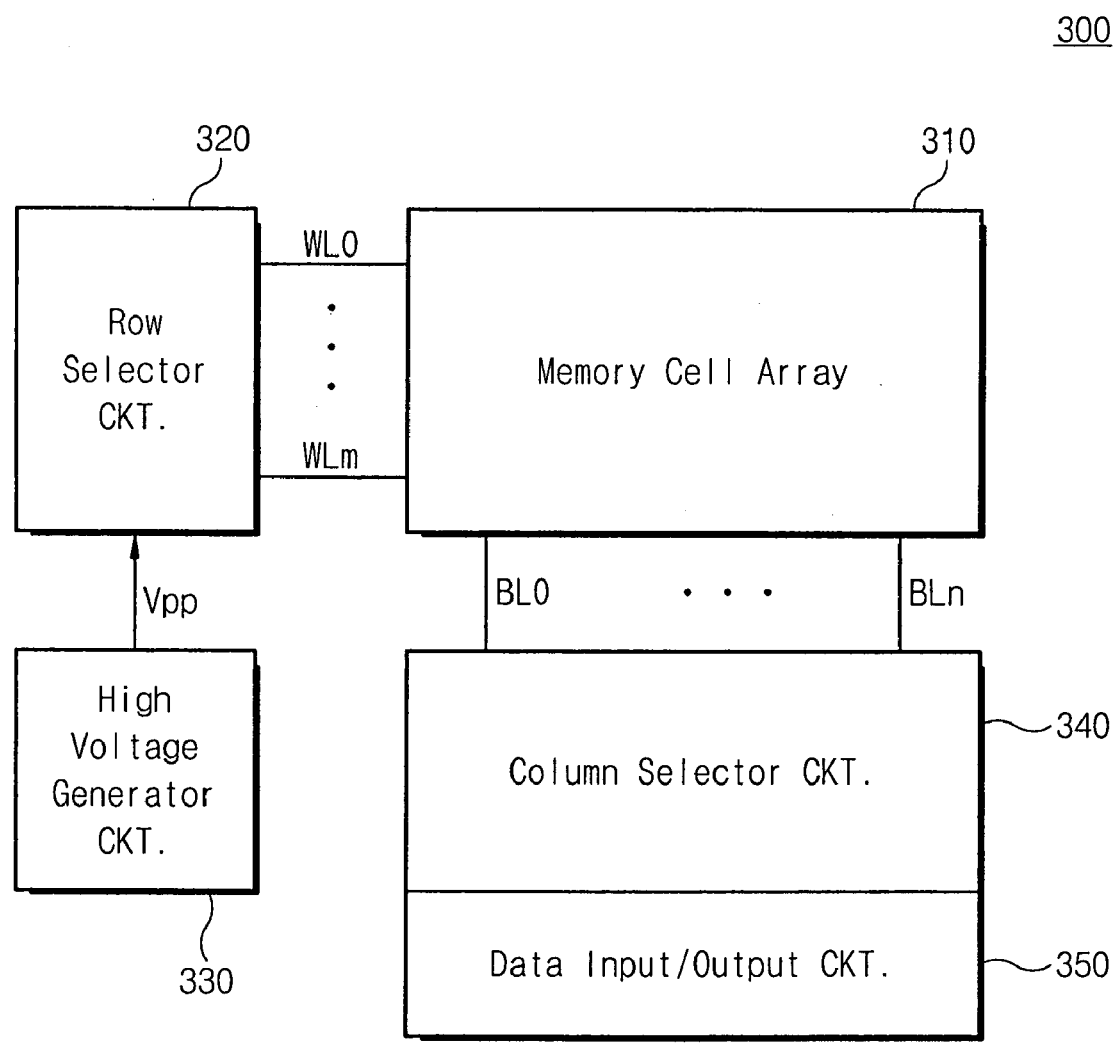
FIG. 8 is a schematic block diagram illustrating a semiconductor memory device that includes a high-voltage generator circuit in accordance with embodiments of the invention.

FIG. 8 is a schematic block diagram illustrating a semiconductor memory device that includes a high-voltage generator circuit in accordance with embodiments of the invention.

Referring to FIG. 8, the semiconductor memory device 300 includes a memory cell array 310, which includes a plurality of memory cells arranged in rows and columns. Each of the memory cells includes a volatile memory cell and a nonvolatile memory cell. The row selector circuit 320 selects rows (or word lines) of the memory cell array 310 in response to row address information. The selected word lines are driven with a word line voltage required for each of operation modes. The high-voltage generator circuit 330 generates a high voltage Vpp as a word line voltage required for each of operation modes. The high-voltage generator circuit 330 may include the high-voltage pump block and the voltage detector block as described above, and the voltage detector block may be one of the voltage detector blocks illustrated in FIG. 4, 6, or 7. The column selector circuit 340 selects columns (or bit lines) of the memory cell array 310 in response to column address information, and the data input/output circuit 350 writes/reads data to/from memory cells through the selected bit lines.

Embodiments of the invention may be practiced in many ways. What follows are exemplary, non-limiting descriptions of some embodiments of the invention.

According to some embodiments, a voltage detector circuit includes a voltage divider, a discharge section, a comparator and a control signal generator. The voltage divider divides a high voltage to generate a divided voltage at an output node. The discharge section discharges the high voltage as the power supply voltage in response to a first control signal. The comparator determines whether the divided voltage of the output node reaches a reference voltage. The control signal generator outputs a second control signal in response to the output signal of the comparator and the first control signal.

The voltage divider includes a high-voltage prevention circuit for preventing the high voltage from being applied to a low-voltage transistor of the comparator while the high voltage is discharged. The voltage divider may further include a first resistor, a second resistor and a low-voltage transistor. One terminal of the first resistor is connected to the high voltage, and one terminal of the second resistor is connected to the output node. The low voltage transistor may include a drain connected to the other terminal of the second resistor, a source connected to a ground voltage, and a gate for receiving a third control signal.

The high-voltage prevention circuit may include a high-voltage transistor including a drain connected to the other terminal of the first resistor, a source connected to the output node, and a gate connected to the power supply voltage. The high-voltage transistor may be a depletion-type NMOS transistor having a negative threshold voltage.

Alternatively, the high-voltage prevention circuit includes a high-voltage transistor including a drain connected to the other terminal of the first resistor, a source connected to the output node, and a gate connected to receive a fourth control signal. The high-voltage transistor may be an enhancement-type NMOS transistor.

The voltage divider may further include a first resistor, a second resistor, and a high-voltage transistor. One terminal of the first resistor is connected to the high voltage, and one terminal of the second resistor is connected to the output node. The first high-voltage transistor includes a drain connected to the other terminal of the second resistor, a source connected to a ground voltage, and a gate connected to receive a third control signal.

The high-voltage prevention circuit may include a drain connected to the output terminal, a source connected to the comparator, and a gate connected to receive a fourth control signal. The third and fourth control signals are inactivated when the discharge operation is performed. The first and second high-voltage transistors may each be enhancement-type NMOS transistors.

In other embodiments of the invention, a high-voltage generator circuit includes a high-voltage pump circuit and a voltage detector circuit. The high-voltage pump circuit generates a high voltage in response to a pump control signal, and the voltage detector circuit generates the pump control signal according to whether the high voltage reaches a target voltage. The voltage detector circuit includes a voltage divider, a comparator, and a pump control signal generator. The voltage divider divides the high voltage and generates the divided voltage to an output node. The comparator determines whether the divided voltage of the output node reaches a reference voltage. The pump control signal generator generates the pump control signal in response to an output signal of the comparator.

The voltage divider includes a first resistor, a high-voltage depletion-type MOS transistor, a second resistor, and a low-voltage NMOS transistor. One terminal of the first resistor is connected to the high voltage. The high-voltage depletion-type NMOS transistor includes a drain connected to the other terminal of the first resistor, a source connected to the output node, and a gate connected to the power supply voltage. One terminal of the second resistor is connected to the output node. The low-voltage NMOS transistor includes a drain connected to the other terminal of the second resistor, a source connected to a ground voltage, and a gate connected to receive a first control signal.

In addition, the voltage detector circuit may further include a discharge section for discharging the high voltage as a power supply voltage in response to a second control signal and a complementary signal thereof.

According to still other embodiments, a high-voltage generator circuit includes a high-voltage pump circuit and a voltage detector circuit. The high-voltage pump circuit generates a high voltage in response to a pump control signal. The voltage detector circuit generates the pump control signal according to whether the high voltage reaches a target voltage. The high-voltage detector circuit includes a voltage divider, a comparator, and a pump control signal generator. The voltage divider divides a high voltage and generates the divided voltage to an output node. The comparator determines whether the divided voltage of the output node reaches a reference voltage. The pump control signal generator generates the pump control signal in response to an output signal of the comparator. The voltage divider includes a first resistor, a high-voltage enhancement-type MOS transistor, a second transistor, and a low voltage NMOS transistor. One terminal of the first resistor is connected to a high voltage. The high-voltage enhancement-type MOS transistor includes a drain connected to the other terminal of the first resistor, a source connected to the output node, and a gate connected to receive a first control signal. One terminal of the second resistor is connected to the output node. The low-voltage NMOS transistor includes a drain connected to the other terminal of the second resistor, a source connected to a ground voltage, and a gate connected to receive a second control signal. In addition, the voltage detector circuit further includes a discharge section for discharging the high voltage as a power supply voltage in response to a third control signal and a complementary signal thereof.

According to some other embodiments, the high-voltage generator circuit includes a high-voltage pump circuit and a voltage detector circuit. The high-voltage pump circuit generates a high voltage in response to a pump control signal. The voltage detector circuit generates the pump control signal according to whether the high voltage reaches a target voltage. The voltage detector circuit includes a voltage divider for dividing the high voltage to generate the divided voltage to an output node, a comparator for determining whether the divided voltage of the output node reaches a reference voltage, and a pump control signal generator for generating the pump control signal in response to an output signal of the comparator. The voltage divider includes a first resistor having one terminal connected to the high voltage and the other terminal is connected to the output node, a second resistor having a terminal connected to the output node, a first high-voltage enhancement-type NMOS transistor including a drain connected to the output node, a source connected to the comparator, and a gate connected to receive a first control signal. The voltage divider also includes a second high-voltage enhancement-type NMOS transistor including a drain connected to the other terminal of the second resistor, a source connected to a ground voltage, and a gate connected to receive a second control signal. In addition, the voltage detector circuit includes a discharge section for discharging the high voltage as a power voltage in response to a third control signal and a complementary signal thereof.

According to embodiments of the invention, a semiconductor memory device includes an array with memory cells arranged along row and columns, a row selector circuit for selecting at least one of the rows and driving the selected row with a word line voltage, and a high-voltage generator circuit for generating a high voltage as the word line voltage. The high-voltage generator circuit may have all of the features that were described above.

According to the present invention, a low-voltage transistor may be prevented from being broken down by cutting off a high voltage directly applied to a low-voltage transistor. A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure the invention.

While the invention has been disclosed in its preferred embodiments, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and sub-combinations of the various elements, features, functions and/or properties disclosed herein, as defined in the attached claims.

We claim:

1. A voltage detector circuit, comprising:
a voltage divider configured to divide a high voltage to generate a divided voltage at an output node, the voltage divider including a first resistor having a first terminal connected to the high voltage, a second resistor having a first terminal connected to the output node, and a first low-voltage transistor having a drain connected to a second terminal of the second resistor, a source connected to a ground voltage, and a gate configured to receive a first control signal;
a discharge section configured to discharge the high voltage to a power supply voltage in response to a second control signal;
a comparator configured to determine whether the divided voltage at the output node reaches a reference voltage; and
a control signal generator configured to output a pump control signal in response to a comparator output signal and the second control signal, the voltage divider including a high-voltage prevention circuit configured to prevent the high voltage from being applied to a second low-voltage transistor of the comparator while the high voltage is discharged, the high-voltage prevention circuit including a first high-voltage transistor having a drain connected to a second terminal of the first resistor, a source connected to the output node, and a gate connected to the power supply voltage.

2. The circuit of claim 1, the first high-voltage transistor comprising a depletion-type NMOS transistor having a negative threshold voltage.

3. The circuit of claim 1, wherein the gate of the first high-voltage transistor is connected to a third control signal instead of the power supply voltage.

4. The circuit of claim 3, the first and third control signals configured to be inactivated when the discharge section discharges the high voltage to the power supply voltage; and
the high-voltage transistor comprising an enhancement-type NMOS transistor.

5. The circuit of claim 1, wherein a second high-voltage transistor is used instead of the first low-voltage transistor, the second high voltage transistor having a drain connected to the second terminal of the second resistor, a source connected to the ground voltage, and a gate configured to receive the first control signal, and wherein the gate of the first high-voltage transistor is connected to a third control signal instead of the power supply voltage.

6. The circuit of claim 5, the first and third control signals configured to be inactivated when the discharge section discharges the high voltage to the power supply voltage; and
the first and the second high-voltage transistors comprising enhancement-type NMOS transistors.

7. A high-voltage generator circuit comprising:
a high-voltage pump circuit structured to generate a high voltage in response to a pump control signal; and
a voltage detector circuit structured to generate the pump control signal in response to the high voltage reaching a target voltage level, the voltage detector circuit including
a voltage divider structured to generate a divided voltage at an output node by dividing the high voltage, the voltage divider structured to prevent the high voltage from being applied to the output node, the voltage divider including
a first resistor having a first terminal connected to the high voltage,
a high-voltage depletion-type MOS transistor that includes a drain connected to a second terminal of the first resistor, that includes a source connected to the output node, and that includes a gate connected to a power supply voltage,
a second resistor having a first terminal connected to the output node, and
a low-voltage NMOS transistor that includes a drain connected to a second terminal of the second resistor, that includes a source connected to a ground voltage, and that includes a gate configured to receive a first control signal,
the voltage detector circuit further including
a comparator structured to determine whether the divided voltage of the output node reaches a reference voltage level, and
a pump control signal generator structured to generate the pump control signal in response to an output signal of the comparator.

8. The circuit of claim 7, the voltage detector circuit further comprising a discharge section structured to discharge the high voltage to the power supply voltage in response to a second control signal and a signal that is complementary to the second control signal.

9. A high-voltage generator circuit comprising:
a high-voltage pump circuit for generating a high voltage in response to a pump control signal; and
a voltage detector circuit for generating the pump control signal when the high voltage reaches a target voltage level, the voltage detector circuit including
a voltage divider for dividing the high voltage to generate a divided voltage at an output node, the voltage divider configured to prevent the high voltage from being applied to the output node, the voltage divider including
a first resistor having a first terminal connected to the high voltage,
a high-voltage enhancement-type MOS transistor including a drain connected to a second terminal of the first resistor, a source connected to the output node, and a gate configured to receive a first control signal,
a second resistor having a first terminal connected to the output node, and
a low-voltage NMOS transistor including a drain connected to a second terminal of the second resistor, a source connected to a ground voltage, and a gate configured to receive a second control signal, the voltage detector circuit further including
a comparator for determining whether the divided voltage of the output node reaches a reference voltage level, and
a pump control signal generator for generating the pump control signal in response to an output signal of the comparator.

10. The circuit of claim 9, the voltage detector circuit further comprising a discharge section for discharging the high voltage to a power supply voltage in response to a third control signal and a signal that is complementary to the third control signal.

11. A circuit comprising:
a high-voltage generator circuit for generating a high voltage in response to a pump control signal; and
a voltage detector circuit for generating the pump control signal according to whether the high voltage reaches a target voltage level, the voltage detector circuit including
a voltage divider for dividing the high voltage to generate the divided voltage at an output node, the voltage divider including a first resistor having a first terminal connected to the high voltage and a second terminal connected to the output node, a second resistor having a first terminal connected to the output node, a first high-voltage enhancement-type NMOS transistor having a drain connected to the output node, a source connected to the comparator, and a gate configured to receive a first control signal, and a second high-voltage enhancement-type NMOS transistor having a drain connected to a second terminal of the second resistor, a source connected to a ground voltage, and a gate configured to receive a second control signal,
a comparator for determining whether the divided voltage at the output node reaches a reference voltage level, the comparator including transistors, the transistors included in the comparator having a low breakdown voltage compared to the first and second high-voltage enhancement-type NMOS transistors, and
a pump control signal generator for generating the pump control signal in response to an output signal of the comparator.

12. The circuit of claim 11, the voltage detector circuit further comprising a discharge section for discharging the high voltage to a power supply voltage in response to a third control signal and a signal that is complementary to the third control signal.

13. A semiconductor memory device comprising:
an array of memory cells arranged in rows and columns;
a row selector circuit for selecting at least one of the rows to drive the selected row with a word line voltage; and
a high voltage generator circuit for generating a high voltage as the word line voltage,
the high-voltage generator circuit including
a high-voltage pump circuit for generating a high voltage in response to a pump control signal; and
a voltage detector circuit for generating the pump control signal according to whether the high voltage reaches a target voltage level, the voltage detector circuit including
a voltage divider for dividing the high voltage to generate a divided voltage at an output node, the voltage divider including a first resistor having a first terminal connected to the high voltage, a second resistor having a first terminal connected to the output node, a high-voltage depletion-type MOS transistor having a drain connected to a second terminal of the first resistor, a source connected to the output node, and a gate connected to a power supply voltage, and a low-voltage NMOS transistor having a drain connected to a second terminal of the second resistor, a source connected to a ground voltage, and a gate configured to receive a first control signal,
a discharge section for discharging the high voltage to a power supply voltage in response to a second control signal,
a comparator for determining whether the divided voltage of the output node reaches a reference voltage level, and a pump control signal generator for generating the pump control signal in response to an output signal of the comparator and the second control signal.

14. A semiconductor memory device comprising:
an array of memory cells arranged in rows and columns;
a row selector circuit for selecting at least one of the rows to drive the selected row with a word line voltage; and
a high-voltage generator circuit for generating a high voltage as the word line voltage the high-voltage generator circuit including
a high-voltage pump circuit for generating a high voltage in response to a pump control signal; and
a voltage detector circuit for generating the pump control signal according to whether the high voltage reaches a target voltage level, the voltage detector circuit including
a voltage divider for generating a divided voltage at an output node by dividing the high voltage, the voltage divider including a first resistor having a first terminal connected to the high voltage, a second resistor having a first terminal connected to the output node, a high-voltage depletion-type MOS transistor having a drain connected to a second terminal of the first resistor, a source connected to the output node, and a gate connected to a power supply voltage, and a low-voltage NMOS transistor having a drain connected to a second terminal of the second resistor, a source connected to a ground voltage, and a gate configured to receive a first control signal
a discharge section for discharging the high voltage to the power supply voltage in response to a second control signal,
a comparator for determining whether the divided voltage of the output node reaches a reference voltage level, and
a pump control signal generator for generating the pump control signal in response to an output signal of the comparator and the second control signal.

15. A semiconductor memory device comprising:
an array of memory cells arranged in rows and columns;
a row selector circuit for selecting at least one of the rows to drive the selected row with a word line voltage; and
a high-voltage generator circuit for generating the high voltage as the word line voltage, the high-voltage generator circuit including
a high-voltage pump circuit for generating the high voltage in response to a pump control signal, and
a voltage detector circuit for generating the pump control signal according to whether the high voltage reaches a target voltage level, the voltage detector circuit including
a voltage divider for generating a divided voltage at the output node by dividing the high voltage, the voltage divider including a first resistor having a first terminal connected to the high voltage and a second terminal connected to the output node, a second resistor having a first terminal connected to the output node, a first high-voltage enhancement-type NMOS transistor having a drain connected to the output node, a source connected to the comparator, and a gate configured to receive a second control signal, and a second high-voltage enhancement-type NMOS transistor having a drain connected to a second terminal of the second resistor, a source connected to a ground voltage, and a gate configured to receive a first control signal, a discharge section for discharging the high voltage to a power supply voltage in response to a second control signal;

a comparator for determining whether a divided voltage of the output node reaches a reference voltage level the comparator including transistors, the transistors included in the comparator having a relatively low breakdown voltage compared to the first and second high-voltage enhancement-type NMOS transistors; and a pump control signal generator for outputting the pump control signal in response to an output signal of the comparator and the second control signal.

* * * * *